United States Patent
Kamaraj et al.

(10) Patent No.: US 6,501,757 B1
(45) Date of Patent: Dec. 31, 2002

(54) ATM SWITCH

(75) Inventors: Muthusamy Kamaraj, New Delhi (IN); Mariamma Joselin, New Delhi (IN); Kalyanaraman Pattabhiraman, New Delhi (IN); Satish Manohar Kulkarni, New Delhi (IN); Jain Philip, New Delhi (IN); Jayant Bhatnagar, New Delhi (IN); Pradeep Kumar Bhatnagar, New Delhi (IN); Kailash Narain Gupta, New Delhi (IN); Adde Palli Gopinath Dixit, New Delhi (IN)

(73) Assignee: Centre For Development of Telematics, New Delhi (IN)

(*) Notice: Subject to any disclaimer, the term of this patent is extended or adjusted under 35 U.S.C. 154(b) by 0 days.

(21) Appl. No.: 09/519,072

(22) Filed: Mar. 6, 2000

(51) Int. Cl.[7] .............................................. H04L 12/28
(52) U.S. Cl. ................................. 370/395; 370/395.41
(58) Field of Search ............................... 370/230, 230.1, 370/235.5, 389, 395, 395.1, 396, 397, 395.21, 395.3, 395.4, 395.41, 395.42, 395.43, 395.71, 395.7

(56) References Cited

U.S. PATENT DOCUMENTS

| | | | |
|---|---|---|---|
| 5,271,004 A | 12/1993 | Proctor et al. | 370/60 |
| 5,636,210 A | 6/1997 | Agrawal | 370/390 |
| 5,859,846 A | 1/1999 | Kim et al. | 370/389 |
| 5,875,190 A | 2/1999 | Law | 370/395 |
| 6,009,078 A | 12/1999 | Sato | 370/232 |
| 6,009,100 A | 12/1999 | Gausmann et al. | 370/397 |
| 6,011,779 A | 1/2000 | Wills | 370/236 |
| 6,067,298 A * | 5/2000 | Shinohara | 370/395 |
| 6,141,323 A * | 10/2000 | Rusu | 370/236 |
| 6,144,635 A * | 11/2000 | Nakagawa | 370/229 |
| 6,144,640 A * | 11/2000 | Simpson et al. | 370/236 |
| 6,185,212 B1 * | 2/2001 | Sakamoto et al. | 370/395 |
| 6,388,993 B1 * | 5/2002 | Shin et al. | 370/233 |

* cited by examiner

Primary Examiner—Wellington Chin
Assistant Examiner—Brenda Pham

(57) ABSTRACT

An ATM switch having a plurality of input-ports and a plurality of output ports allowing a plurality of priority levels, which is highly modular allowing expansion of the number of cell buffers in a shared buffer pool, thus efficiently handling bursty traffic of one-to-one and one-to-many destination ports, using the bit slicing concept to reduce the operating speed of the switch, and decrease the cell buffer size requirement per slice along with reducing the number of shared queue memories per slice, aiding cost effective and efficient, very large scale integration (VLSI) implementation. It also allows configurability of input link speeds, taking care of the order of cell delivery to the output ports. The switch on receiving the input cell, searches for a free buffer in the shared pool, then routes the cell into this buffer and indexes the pointer into an output queue called the queue management module which uses a shared pool of queue memories. The buffers are then read out in the order of priority and sequence of arrival at the input, by this queue management module. It provides initialization, control and status monitoring features too, through a processor interface module.

9 Claims, 11 Drawing Sheets

Block diagram of the ATM switch

Block diagram of the ATM switch

Buffer Assignment Module

INPUT CROSSBAR SWITCH

Shared Buffer Pool

OUTPUT CROSSBAR SWITCH

Speed configurability of output ports

ATM SWITCH

FIELD OF THE INVENTION

The present invention relates to a versatile ATM cell switch element ASIC having provisions for expandability of number of buffers used to store the cells, and for efficient implementation of internal queues by utilizing the slicing concept. Further the ATM ASIC of the present invention possesses an advantage of configurability of the speeds of input streams while maintaining the total throughput.

BACKGROUND OF THE INVENTION

The ACE ASIC of the present invention is capable of operating at a standard basic link speed, multiples of standard basic link speed and/or combinations thereof while maintaining a constant throughput, without requiring change in the architecture of the switching element. The expandability of the number of buffers, i.e., buffer expansion, used to store the cells is enabled by equipping more devices.

The broadband integrated services digital network (BISDN) which provides for high speed and high density data communications while integrating voice, video and data over a single speed network, are being commercially exploited. CCITT standards recommend implementation of asynchronous transfer mode (ATM) packet switching in BISDN applications which utilizes packet switches for routing information in fixed size data packets called cells between a plurality of inputs and outputs.

Prior art ATM packet switches generally include single stage switches e.g., knock out switch and multistage switches, e.g., starlight switch, each being manifest with their own problems. The knock out switch architecture suffers from several limitations that limit its use in broadband applications. It requires a large number of packet filters and large concentrator which significantly increases the cost and complexity of the packet switches, especially for networks with a great number of inputs and outputs. Another limitation of the knock out switch architecture is that it utilizes a large number of memory buffers for output buffering and requires memory speed-up to accept multiple packets simultaneously at each output port. Additionally knock out type switches do not include the means for sorting data packets for priority and therefore require additional hardware for this function. Finally the implementation of multicasting in a knock out switch requires each output port to first accept all multicast packets and then to reject those that do not belong to it. This also requires additional hardware including large memory buffers to store all the multicast addresses and additional logic to determine whether to accept or reject a multicast packets at the output port.

Similarly starlight switch also suffers from several limitations that limit its utility in broadband applications. For example, to achieve low packet loss, the starlight architecture requires a large sorter and trap network, thereby increasing the number of sorting and switching elements several fold. Additionally the starlight architecture is not modular or expandable in small increments and requires a separate copy network thus increasing the cost of the switch.

Another type of the prior art packet switch is shared buffer switch which finds limited use because it must be operated at a much higher speed for writing all the packets in one clock cycle, thus often introducing head of line blocking. Additionally these switches do not offer a priority mechanism and are not modular.

U.S. Pat. No. 6,011,779 relates to a switch queuing system for transferring cells from a plurality of input channels to a plurality of output channels where the switching system claims to minimize the cell loss for bursty traffic while delay for time-critical data is also avoided. The ATM switch drops cell on a per connection basis, rather than on cell priority level. The sender(s) of the congestion causing data is penalized, rather then other users of the ATM switch.

U.S. Pat. No. 6,009,078 relates to an ATM switch capable of favorably controlling traffic congestion. The ATM switch structure is capable of detecting the traffic congestion all over the ATM switch device by the total queue monitoring buffer and to assure delivery of the output cells equal to the minimum guaranteed value. Each minimum guaranteed value may be determined for each service class and a multicast cell.

U.S. Pat. No. 5,875,190, relates to an ATM switching system, for distributing and concentrating input data packets that is comprised of a distribution section and a concentration section comprising N-priority concentration sorters each having N inputs and L outputs, L being less than N. The sorters comprise means for ordering data packets according to priority information and for transferring only the L data packets according to priority information and for transferring only the L data packets from N inputs which have the highest relative priorities. A multiplicity of the switching arrangements can be interconnected to provide an expanded switching arrangement.

U.S. Pat. No. 5,271,004 relate to an asynchronous transfer mode switching arrangement providing broadcast transmission which includes a serial to parallel converter arranged to receive input packets of data which include routing information, in serial form and convert the packets of data to parallel form. A first random access memory is provided in which each packet of data is entered at an addressed location into the memory, and the address is entered in a respective first-in first-out output queue at the tail.

U.S. Pat. No. 5,859,846 defines a fully interconnected ATM switching apparatus comprising a plurality of line interface circuits, each of the line interface circuits including an input port driver for extracting an SDH transmission frame containing cell data with a fixed length and a connection identifier from an input signal, appending a routing tag to the extracted SDH transmission frame through an input dedicated bus and an output port driver for receiving a cell stream from an output dedicated bus, removing the routing tag from the received cell stream, translating a channel identifier in the connection identifier and transferring the resultant SDH transmission frame to an adjacent node, a system clock distributor for generating a clock signal, an initialization controller for controlling a system and restart operations, a switch maintenance controller for performing a switch maintenance control operation in response to a network managing cell, a switch call processing controller for performing a call processing operation, a switch module controller for controlling a switching operation, and a plurality of switch output multiplexers for switching cells from the input port drivers to the output port drivers under the control of the switch module controller.

U.S. Pat. No. 6,009,100 relates to an asynchronous transfer mode switching network can be made to look like a synchronous tandem switch to end offices connected to the network by establishing a permanent virtual path through the network that carries information between the end offices. Individual channels to be switched are assigned ATM VCI addresses at both ends that correspond to the time slot to the time slot channel being sent and a time slot channel being received.

U.S. Pat. 5,636,210 claims to employ an inexpensive and efficient architecture that is modular and expandable. This patent incorporates priority sorting and improved multicasting while requiring a minimum amount of memory buffers. This patent discloses an ATM packet switch for routing data packets between a plurality of input and output devices. It claims to provide a high degree of modularity by allowing expansion of the switch to handle applications having less than eight input and output devices to applications having $2^{14}$ input and output devices. This patent broadly classifies the single stage switch, two stage switch and three stage asynchronous packet switches each being capable of routing packets between different number of input and out devices. The single stage packet switching is used for routing data packets between eight or less input and output devices by using a single output group modules and is expanded for routing data packets between up to $2^6$ input and output devices by coupling as many as four output group modules together. The two stage asynchronous transfer mode packet switch is most efficient for routing data packets between up to $2^{10}$ input and output devices and includes a plurality of input group modules, a broadcast and recirculation module and a plurality of output group modules. Similarly three stage asynchronous transfer mode packet switch as disclosed provides an additional switching stage for applications with more than $2^{10}$ input and output devices. The preferred three stage asynchronous transfer mode packet switch broadly includes a plurality of input planes and a plurality of output planes.

However, architecture for the above switch as claimed in the above patent does not provide any configurability. If designed to operate at a standards basic link speed the switch can not operate at higher speeds, e.g. an architecture designed for STM -1 works only for STM-1 and can not work for STM-4 link speed. The configurability of link speeds is a required characteristic as this obviates the need for designing different switches for different link speeds.

Further the single stage switches and the multi staged switches employs use of banyan router consuming a large amount of space. This technology is therefore not preferred as per the presently available ASIC technology. The space constraint leads to a heavier hardware configuration.

However, it is still desired to provide an ATM switch having provisions for buffer expansion, efficient handling of internal queuing and configurability of the switch to receive input at various speeds.

The present invention relates to an ATM cell switch element, ACE ASIC, which is an implementation of an ATM self-routing fabric using shared buffer, output queuing technique. The gross functionality of the ASIC is to automatically route incoming packets of data (referred to as cells) to their destinations. The switching is done based on a "routing tag" that is prepended to the packet. This routing tag informs the switch about the destination(s) of the packet and the priority of the packet. The priority information is used to "sort" the packets internal to the switch so that the packets with higher priority are delivered before others.

Due to statistical distribution of the incoming traffic of the packets, there is a necessity of storing the packets inside the switch in a queue. During a given packet time, there may be more than one packet that is destined to an output port. In this case, the priority of the packet is used to determine which of them would be delivered first to the output port. The other packets are stored in the switch inside a queue for delivery at a later time.

Based on this functionality, the sub-tasks that the switch has to perform include the task of receiving the input packet and detaching the routing tag from the packet. Thereafter the routing tag is understood/interpreted and the destination port(s) is/are identified. An internal storage location is thereafter identified for receiving this packet. After this location is determined, the packet is to be written into this location.

After all the incoming packets of a cell time have been received, the desired destinations have to be scanned in order to determine the packets that have to be read out on each output. After the packets with the highest priority have been selected, these have to be read from the internal storage location and delivered to the respective ports.

The corresponding sub-modules that perform these tasks are

1. Routing Tag Detachment (RTD) that receives the cell and separates the routing tag from the cell.
2. Buffer Assignment Module (BAM) that understands the routing tag and determines the desired destination port(s), searches and allocates an internal storage buffer to hold this incoming packet.
3. Input Crossbar Switch (ICS) that routes the incoming packet to the buffer allocated and facilitates the writing of the packet into this buffer.
4. Shared Cell Buffer Pool (SBP) that houses the storage buffers of the switch.
5. Queue Management Module (QMM) that receives the allocated buffer addresses from the BAM and the corresponding destination port(s) and "sequences" the reading of the buffers from the SBP based on the priority of the packets.
6. Output Crossbar Switch (OCS) that routes the packet read out from the SBP towards the destination output port.

The ACE ASIC of the present invention is an improvement over prior art as the switch of the present invention supports additional features as well that makes it a versatile ACE ASIC. The additional features in the ACE ASIC are 1. The expandability of the number of buffers used to store the cells by equipping more devices.
2. The configurability of the speeds of input streams among a standard basic link speed, multiples of standard basic link speed and/or any combination of the above while maintaining the total throughput.
3. The efficient implementation of internal queues by utilizing the "slice" concept.

Apart from the addition of these three features, another improvement incorporated in the ACE ASIC of the present invention is that the internal structure of the ICS and the OCS modules have been changed from a Banyan implementation to a crossbar implementation in order to save the area occupied by these modules within the ASIC. Banyan router has not been used thereby saving a lot of space. By merging regular buffer and overflow buffers the ASIC of the present invention has been made more implementable.

The dimensioning of the number of internal buffers supported within a switch fabric determine, to a large extent, the traffic handling capacity of the switch fabric. The buffer requirements therefore vary depending upon the traffic that a switch is designed to support. Accordingly, either the switch should be designed to support the highest number of buffers that would be required or should have some means to add buffers as necessary. The cost of providing the maximum size buffers inside an ASIC is quite high. The normal expansion method of adding more memory outside the ASIC is not a good enough solution as it generally places very high requirements on the external memory device and consumes additional pins on the device.

In the method of expansion used in the ATM switch of the, present invention, both the problems stated above are taken care of. First, the switch is designed with a certain number of buffers that suffices to serve moderate traffic requirements. Further, more buffer capacity is added by using, not an external memory, but the same switch in "parallel" with the first one. Thus, all that is required is to inform the two devices about the total equipage and the capacity is enhanced accordingly.

In an another embodiment of the present invention, the switch is designed to support input data from a multitude of network elements. These inputs may be coming from links operating at different speeds. A configurable switch matrix is needed for easy use in designs. This does not need the switch to actually work at many different physical speeds. Though such an implementation is possible, it is very complex to realize one. The present invention overcomes the drawbacks of the prior art by using some external multiplexing and de-multiplexing, configured at single constant clock. The ATM switch of the instant invention provides configurability of input speeds among standards basic link speeds, multiples of standards basic link speeds and/or combination of the above, while maintaining the total throughput. The external function for this involves slowing down the physical rate of the faster input links to the speed of the slowest link speed supported by distributing the data onto multiple lines. A speed reduction of ¼ for instance, is obtained by redistributing the input data onto four physical lines. The physical speed of these four lines is then $¼^{th}$ the original speed, while the information rate is the same if all the lines are considered together. Since the basic switch fabric assumes the presence, of complete cells on all its inputs a cell-wise de-multiplex functionality is implemented.

This splitting alone does not complete the support for multiple speed links. The order of delivery is also guaranteed by the switch matrix, i.e., the cells that are delivered are in the same order as they were received in.

In order to support this, the switch fabric maintains a single internal queue for all the "sub-links" of a logical link, though they go out on different physical lines. For example, if there is a 1–4 increase in the link speed, all th data that goes out of the device at a particular (logical) port, are queued up into a single physical queue. During the read-out from the device, this single queue is read four times, but onto four different lines to achieve a 1–4 speed advantage. These four lines are then multiplexed external to the switch to get the high-speed link. The ACE ASIC of the present invention provides for such demultiplexing and multiplexing by use of cell demultiplexer and cell multiplexer.

Further, a common practice in ASIC implementations of switch fabrics is to use a serial-to-parallel converter at the input of the devices in order to slow down the physical speed of operation. Normally, in the case of ATM cell switches, the input links are converted into a 4-bit wide bus so that the operating speed is reduced to a fourth of the line rate. These four input lines are handled either in the same switch or by four separate switches. In the first implementation, called the parallel mode, the number of physical inputs/outputs gets limited as each link now uses four pins of the switch. In the ATM cell switch element, since the design supports a relatively high number of inputs, the second mode, called the sliced mode is used. In this mode, each switch operates only on one of the 4-bit parallel bus. Four switches operate in tandem to realize the complete switch fabric.

In the ACE design of the present invention, an advantage is taken of the fact that for a complete switch fabric, more than one switches (N devices; where N is preferably 4) are present on the board. The QMM uses internal storage structures to organize the queues. The length of the queues supported in a switch is a parameter that determines its traffic handling capacity. More the length of queue that is supported, the better the traffic handling capacity. Here, again, there is the restriction that the increase in the internal memory requirement would lead to additional cost. The ACE of the instant invention is such that each switch holds memory to support only 1/N of the total queue length. By utilizing the fact that there would be N-1 other devices on the board, the memory is distributed across them leading to less area requirement inside one single switch.

Thus the present invention provides a versatile ATM switch which incorporates the features of configurability of speeds, slicing of internal queues to enable efficient implementation and also allows expandability of buffers required to store the cells by equipping more devices.

Apart from these basic functionality, the switch fabric also does some auxiliary functions which include counting the total number of cells that are currently stored inside the switch, the number of cells that are in the queue for each of the ports and the like. The switch here is told to look for certain "events" in the switch like the buffer occupancy levels crossing predetermined thresholds, the queue lengths crossing thresholds etc. Upon occurrence of any of these events, the switch is then asked to inform the external control circuitry by means of an "interrupt". For all these, and other control functions that need to be exercised, there is a separate interface designated as the Processor Interface managed by a Processor Interface Module (PIM) provided in the ATM switch of the present invention.

The present invention uses RAM based buffer assignment modules and queue assignment modules while U.S. Pat. No. 5,636,210 has specified use of registers in buffer management module and in read sequencer module This involves less power dissipation and less logic thus becoming an implementable VLSI. Further, in U.S. Pat. No. 5,636,210 the IBSM was banyan router which again is a register base technology which requires change in operating frequency within the switch as the same uses higher operating frequency for the entire switch. Since it is a register based technology and since the operating frequency is higher, power dissipation is also higher. The banyan router also requires larger area. This has now been efficiently replaced by a crossbar switch obviating the problems related to frequency and power dissipation. The organization of buffers in this U.S. Pat. No. 5,636,210 was such that there were 2 sets of buffers called regular buffers and set of overflow buffers. This concept was changed with only one set of normal buffers. The present invention further provides efficient implementation of internal queue while also allowing configurability of speeds.

SUMMARY OF THE INVENTION

The present invention relates to an ATM switch having a plurality of input ports and a plurality of output ports allowing a plurality of priority levels, which is highly modular, allowing expansion of the number of cell buffers in a shared buffer pool, thus efficiently handling bursty traffic of one to one and one to many destination ports, using the bit slicing concept to reduce the operating speed of the switch and decrease the cell buffer size requirement per slice along with reducing the number of shared queue memories per slice, aiding cost effective and efficient, very large scale integration (VLSI) implementation. It also allows configurability of input link speeds while taking care of the order of cell delivery to the out put ports.

In a specific embodiment of the present invention the switch of the present invention exhibits modularity, for example, a 64×16 switch is capable of being configured to 64×64 switch by adding devices in parallel to work as a single stage switch.

In an another embodiment of the present invention the switch of the present invention is capable of reducing the operating speed of the switch while decreasing the cell buffer size requirement along with reducing the number of shared queue memories, aiding cost effective and efficient VLSI implementation. A bit slicing concept is used where the cell buffer size requirement per slice is reduced as well as the number of shared queue memories per slice is also reduced.

In a further embodiment of the present invention, the switch. of the instant invention allows configurability of input link speeds while taking care of the order of cell delivery to the output ports.

Accordingly the present invention relates to an ATM switch for switching cells from a plurality of input ports to a plurality of output ports supporting a plurality of priority levels, comprising a routing tag detachment module for filtering the input cells, extracting the routing tag from the said filtered input cells, delaying the said filtered cells till the routing tag is processed;

a buffer assignment module for decoding the said routing tag received from the said routing tag detachment module, generating a cell destination port map and priority levels, allocating an internal cell buffer for the incoming cells, deallocating the corresponding cell buffer for outgoing cell, one or more configuration ports provided in the said buffer assignment module for configuring the total number of buffers available;

an input cross bar switch for transmitting cells from the said routing tag detachment module to the said cell buffers allocated by the said buffer assignment module, generating the required control signals for writing the transmitted cell to the said allocated cell buffer, said cell buffer being housed in a shared cell buffer pool organized as a bank of a plurality of groups each containing a plurality of cell buffers;

a queue management module having shared queue memories for receiving the allocated buffer addresses, corresponding cell destination port maps and the priority level of the cells from the said buffer assignment module, sequencing the reading of said cell buffers from the said shared cell buffer pool based on the priority level of the cells; and an output cross bar switch for transmitting the cells read out from the said shared cell buffer pool to the said output ports of the said switch.

Further, in an another embodiment the present invention relates to an ATM switch for switching cells from a plurality of input ports to a plurality of output ports supporting a plurality of priority levels, comprising a N-bit demultiplexer at the input port for slicing the incoming cells into N bit slices thus reducing the speed of operation by a factor of N and reducing the depth of the shared buffer pool storing the cells by a factor of N, each bit slice being delivered to a routing tag detachment module of the said ATM switch for filtering the sliced input cells, extracting the routing tag from the said filtered input cells, delaying the said filtered cells till the routing tag is processed;

a configurable buffer assignment module for decoding the said routing tag received from the said routing tag detachment module generating a cell destination port map and priority levels, allocating an internal cell buffer for the incoming cells, deallocating the corresponding cell buffer for outgoing cell, one or more configuration ports provided in the said buffer assignment module for configuring the total number of buffers available;

an input cross bar switch for transmitting cells from the said routing tag detachment module to the said cell buffers allocated by the said buffer assignment module, generating the required control signals for writing the transmitted cell to the said allocated cell buffer, said cell buffer being housed in a shared cell buffer pool organized as a bank of plurality of groups each containing a plurality of cell buffers, one or more configuration ports provided in the said input crossbar switch for determining the specific range of cell buffer addresses supported by the said shared cell buffer pool;

a queue management module having shared queue memories placed across all the 'N' slices thus reducing the queue memories in each slice by a factor of N thereby reducing the area of queue management module, for receiving the allocated buffer addresses, corresponding cell destination port maps and the priority level of the cells from the said buffer assignment module, sequencing the reading of said cell buffers from the said shared cell buffer pool based on the priority level of the cells, one or more configuration ports provided in the said queue management module for configuring the said bit slice numbers, determining the specific range of queue memory addresses supported by each of the said queue management modules;

an output cross bar switch comprising one or more configuration ports determining the specific range of cell buffer addresses supported by the said shared cell buffer pool, for transmitting the cells read out from the said shared cell buffer pool to an N-bit multiplexer for recombining the N-bit sliced outputs from the N-output crossbar switches at the output port of the said switch.

Further, the present invention also relates to an ATM switch for switching cells from a plurality of input ports to a plurality of output ports supporting a plurality of priority levels, accepting inputs at a standard basic link speed, multiples of the standard basic link speed and combinations thereof while maintaining a constant throughput by the use of a cell demultiplexer at the input port for inputs operating at speeds higher than the standard basic link speed, comprising a N-bit demultiplexer at the input port for slicing the incoming cells into N bit slices thus reducing the speed of operation by a factor of N and reducing the depth of the shared buffer pool storing the cells by a factor of N, each bit slice being delivered to a routing tag detachment module of the said ATM switch for filtering the input cells, extracting the routing tag from the said filtered input cells, delaying the said filtered cells till the routing tag is processed;

a configurable buffer assignment module for decoding the said routing tag received from the said routing tag detachment module generating a cell destination port map and priority levels, allocating an internal cell buffer for the incoming cells, deallocating the corresponding cell buffer for outgoing cell, one or more configuration ports provided in the said buffer assignment module for configuring the total number of buffers available;

an input cross bar switch for transmitting cells from the said routing tag detachment module to the said cell buffers allocated by the said buffer assignment module, generating the required control signals for writing the transmitted cell to the said allocated cell buffer, said cell buffer being housed in a shared cell buffer pool organized as a bank of plurality of groups each containing a plurality of cell buffers, one or more configuration ports provided in the said input crossbar switch for determining the specific range of cell buffer addresses supported by the said shared cell buffer pool;

a queue management module having shared queue memories placed across all the 'N' slices thus reducing the queue memories in each slice by a factor of N thereby reducing the area of queue management module, for receiving the allocated buffer addresses, corresponding cell destination port maps and the. priority level of the cells from the said buffer assignment module, sequencing the reading of said cell buffers from the said shared cell buffer pool based on the priority level of the cells, one or more configuration ports provided in the said queue management module for configuring the said bit slice numbers, determining the specific range of queue memory addresses supported by each of the said queue management modules, maintaining a single queue across multiple output ports for links operating at speeds higher than the standard basic link speed to ensure the order of delivery of cell in conformity with the order of the cell arrival at the input for all cells within each ATM connection;

an output cross bar switch comprising one or more configuration ports determining the specific range of cell buffer addresses supported by the said shared cell buffer pool, for transmitting the cells read out from the said shared cell buffer pool to an N-bit multiplexer for recombining the N-bit sliced outputs from the N-output crossbar switches; and a cell multiplexer receiving the said recombined cells at output ports operating at speeds higher than the standard basic link speed to obtain the cells at the desired operating speeds.

BRIEF DESCRIPTION OF THE ACCOMPANYING DRAWINGS

Figure 9:
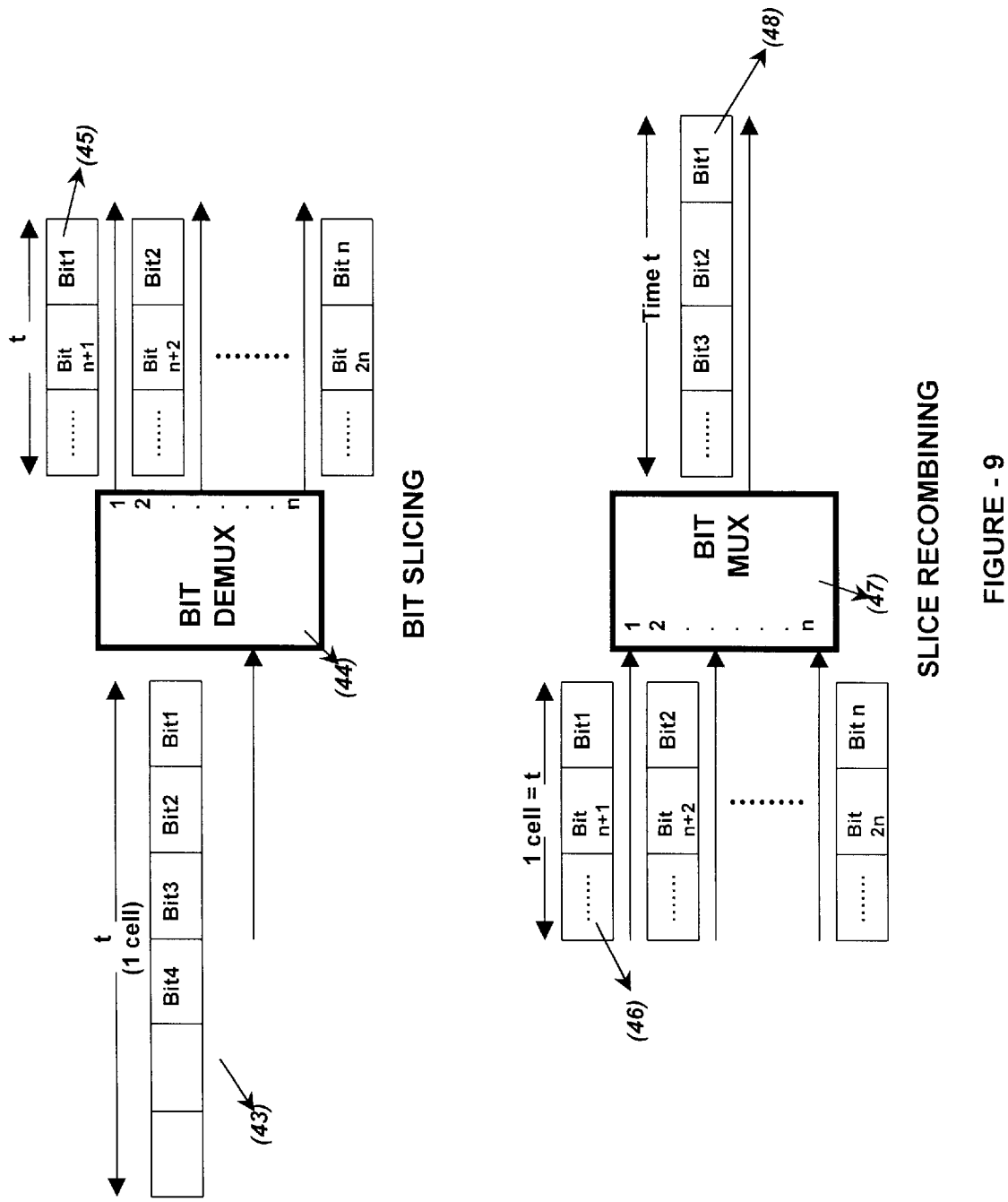

FIG. 9 brings out the bit slicing and slice recombining by the use of N-bit demultiplexer and N-bit multiplexer.

Figure 10:
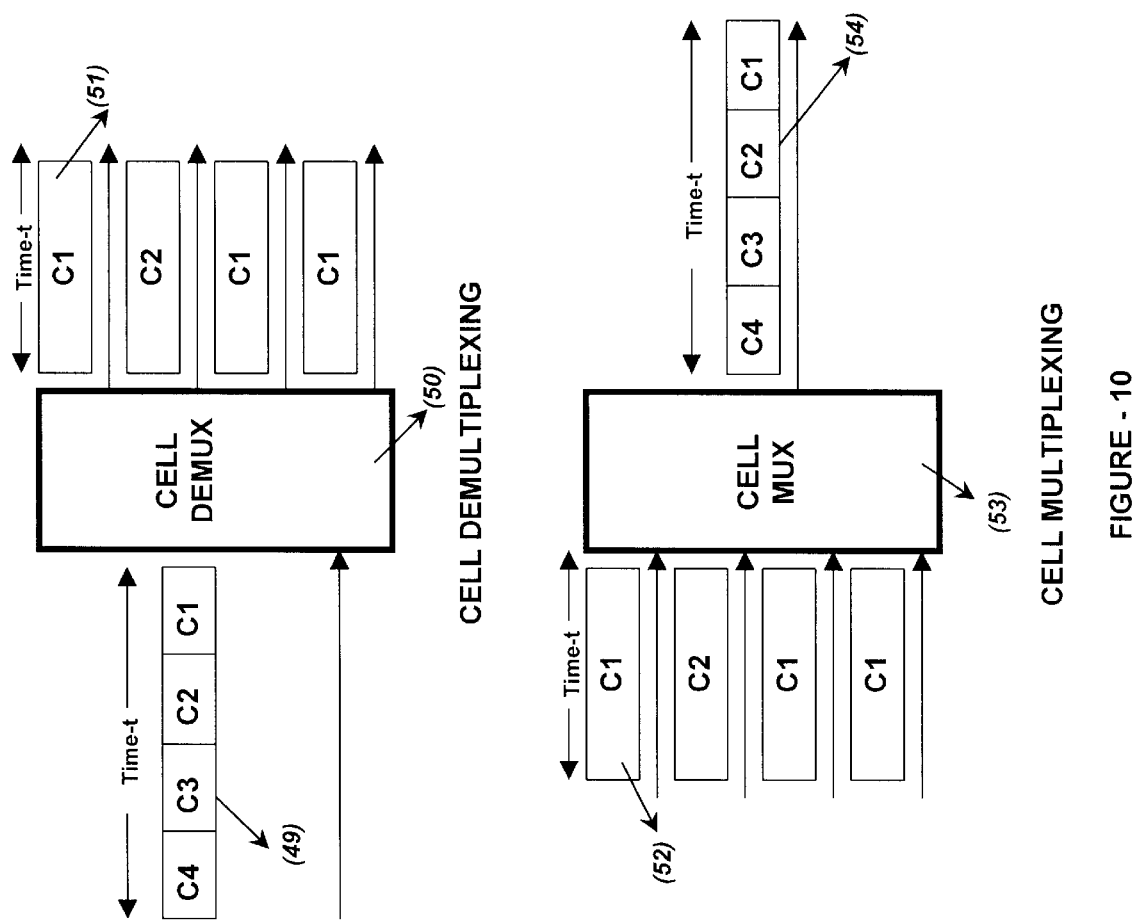

FIG. 10 brings out the cell demultiplexing and cell multiplexing.

Figure 11:
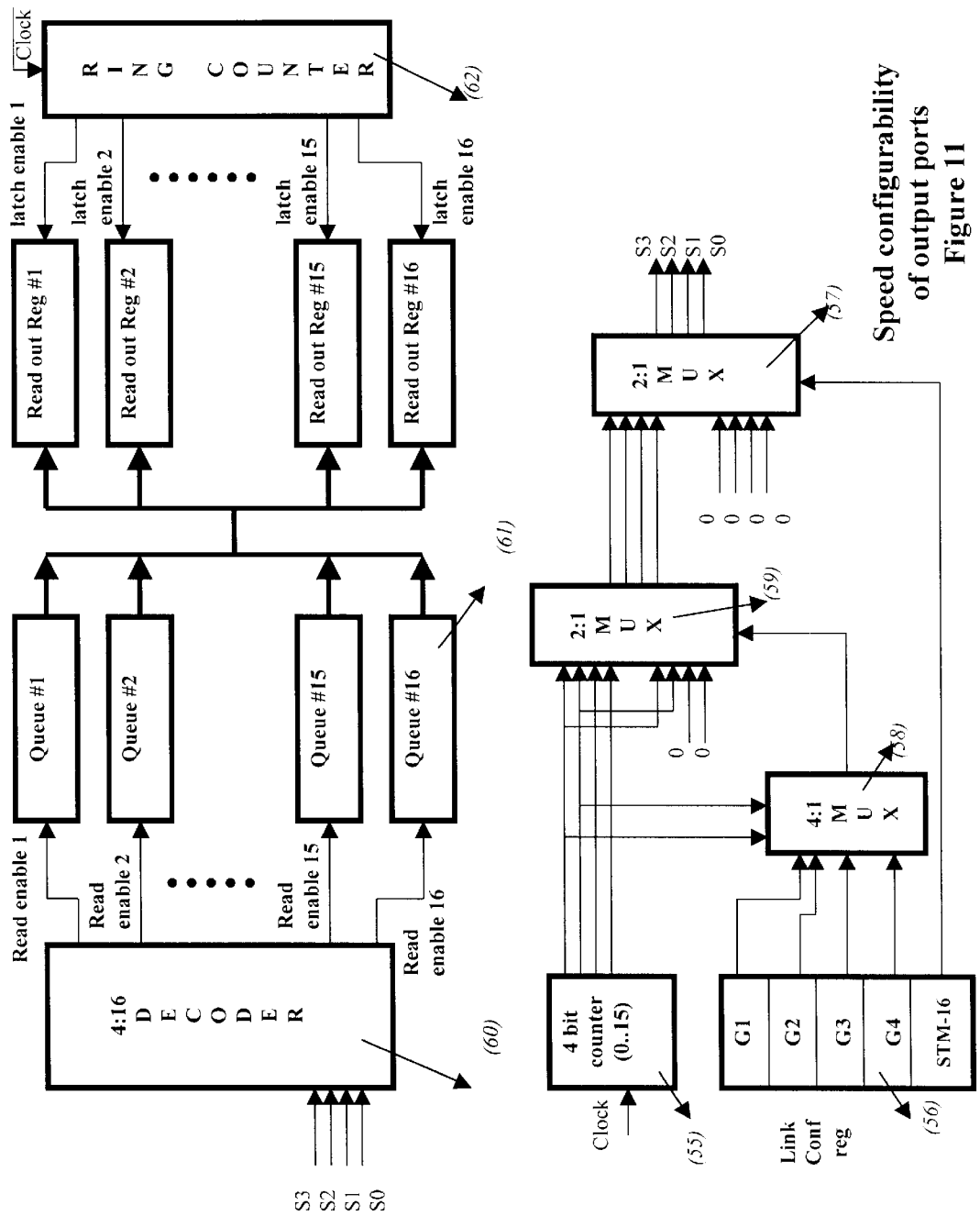

FIG. 11 specifies the speed configurability of the output ports.

DETAILED DESCRIPTION OF THE INVENTION WITH REFERENCE TO THE ACCOMPANYING DRAWINGS

Figure 1:
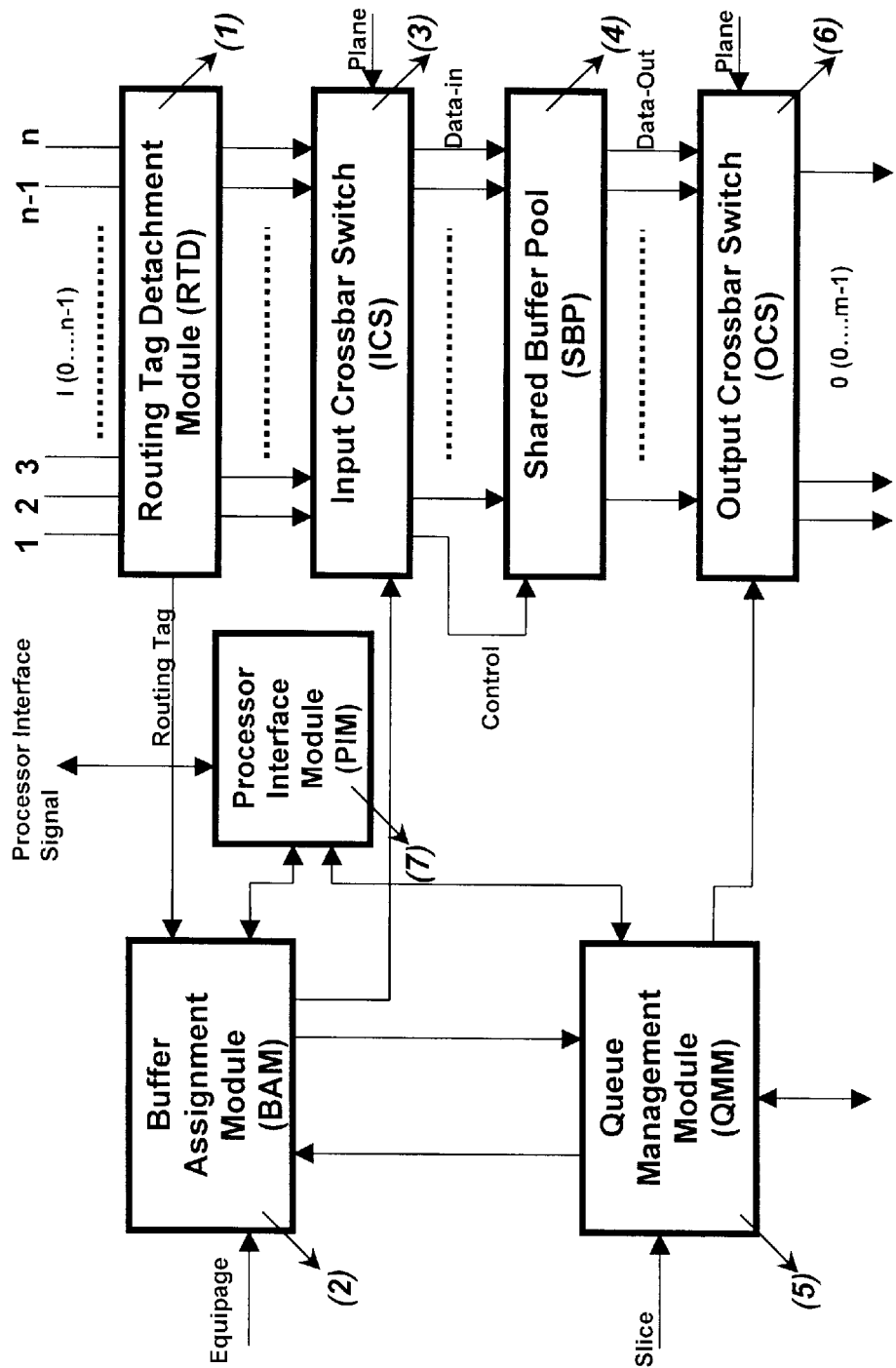
FIG. 1 shows the block diagram of the ATM switch highlighting various modules and their interconnections.
Figure 2:
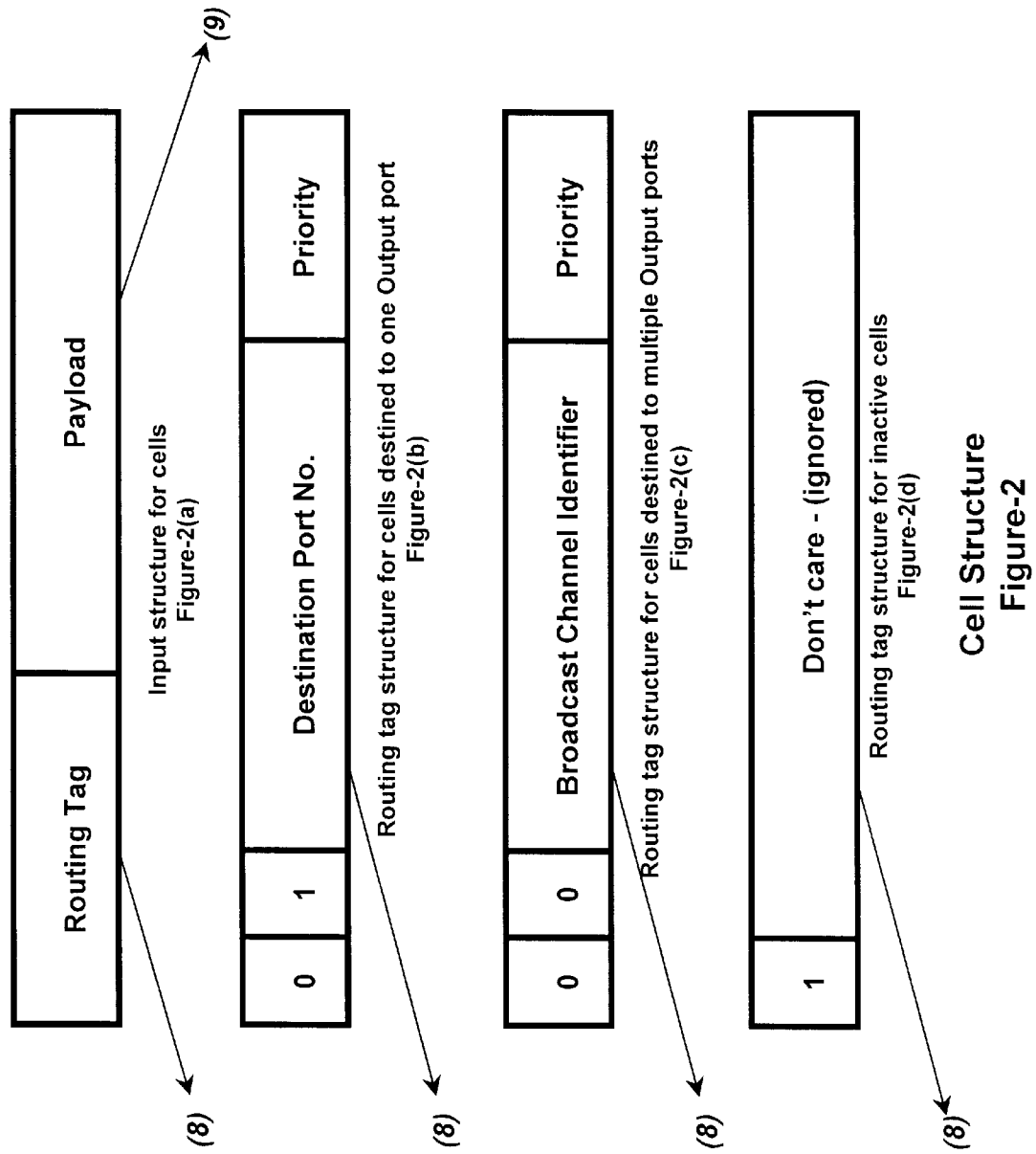
FIG. 2 shows the cell structure.

The ATM switch, as shown in FIG. 1, of the present invention is having a plurality of input ports and plurality of output ports allowing a plurality of priority levels. The ATM cell switch element preferably uses clock speed of 50 MHz. The cell I/O to the ACE is in serial mode. The switch on receiving the input cell, searches for a free buffer in the shared cell buffer pool (SBP) (4), then routes the cell into this buffer and indexes the pointer into an output queue called queue management module QMM (5) which uses a shared pool of queue memories. The buffers are then read out in the order of priority and sequence of arrival at the input. The switch has a special module for providing initialization, control and status monitoring feature.

The ACE of the present invention is a shared buffer L×M switch that supports M output ports while receiving inputs on L links. The ACE upon receiving a cell on the input link, searches for a free buffer in the buffer pool. It then routes the cell into this buffer and indexes the pointer into an output queue. The buffers are then read out in the order of priority. The ATM cell switch element comprises several modules including routing tag detachment module (RTD) (1), input crossbar switch (ICS) (3), shared cell buffer pool (SBP) (4), output crossbar switch (OCS) (6), buffer assignment module (BAM) (2), queue management module (QMM) (5) and processor interface module (PIM) (7).

The configurability of speeds from a standard basic link speeds, to multiples of standard basic link speeds and/or combination of these link speeds is achieved by using cell demultiplexer at the input port and a cell multiplexer at the input port. Cell demultiplexing and multiplexing is shown in FIG. 10.

To support buffer expansion, the present invention uses modified BAM (2), ICS (3) and OCS (6) modules. In the BAM, in the prior art, the initialization tables are filled based on a fixed number of maximum buffers. In the present invention, the maximum number of buffers that may be used is derived from external configuration pins, thereby allowing for a flexible number of buffer to be seen by the switch and for the BAM (2), the total number of buffers would be as indicated by the external pins.

The ICS (3), which facilitates the write into the cell buffers, checks other things before allowing the write to the shared cell buffer pool to go through. The ACE ASIC of the present invention also supports two external pins for the user to indicate the position of the switch in the buffer expansion hierarchy (0 if it is the first switch, 1 if it is the first set of additional buffers and so on). ICS (3) uses these pins to check if the write to the SBP (4) is possible. The BAM (2) provides the allocated buffer address to the ICS (3). The ICS (3) checks the buffer number with the external pins indicating the position. If the positional pins indicate that it is the first switch, passes all write to buffers 1 to n where n is the maximum number of buffers in a switch. In case the positional pins indicate that it is the first set of additional buffers, then, it passes only those writes that are destined to buffer numbers n+1 to 2n. The $3^{rd}$ and $4^{th}$ expansion buffer sets behave in a similar fashion.

During readout, the QMM (5) generates the address of the buffer that is to be read out. Here again the buffer address is checked against the positional values. Only that switch that houses the desired buffer to be read out drives the output port while other switches do not.

For efficient implementation of internal queues by utilizing the "slice" concept, in order to readout the cells from a unified queue into multiple ports, the QMM of the "prior art" has been modified. In the prior art, there are always 16 queues, which are read out to the 16 output ports of the device, the mapping of the queues to the ports being fixed in nature (one-to-one). In the ACE ASIC of the present invention, depending on the speed configuration, a queue is read multiple times (a four time speed-up implies reading of the same queue four times), but the outputs to which the data is read out, is not fixed. Instead, a single queue may feed up to all 16 ports, thus achieving a speed-up of 16×. A mixture of any combination of 1×, 4×links or a 16×link is thus supported by the switch of the instant invention.

The QMM of the "prior art" is modified to support this distributed queue implementation. Here again, the control circuits of QMM (5) are initialized to believe that the entire memory required to support the maximum queue length are located in the switch. When there is a need to read or write to them, there is a filtering done based on the "Slice-ID" that is programmed on the pins of the switch. In order to support four slices, two Slice-ID bits are used. This tells the switch-if it is handling the first slice, or the second slice and so on. In the case of QMM (5), there is a requirement to handle 192 queue memories where only 192/N are located in a switch. Here again as in the case of the BAM (2), the first slice writes the data if any of the first memories are addressed. If the next N are addressed, the second slice writes the data and so on.

During the read out phase, the data that is read out from these memories required by all the N switches. Hence, the data bus from these memories is shared by all the N switches and the data is available to all the slices. Thus by partitioning the queue memories, the area that is required for implementing the QMM (5) is reduced.

The combination of these three changes facilitates the expansion of the buffers in multiples of A where A is the maximum number of buffers in a single switch. There is no theoretical limit for the working of the principle. In the ACE ASIC of the instant invention, it is preferred that the expansion be limited to aminaximnum of four devices and the dimensioning of the internal control structures of, the BAM (2) have been chosen to limit this to a maximum of four.

Figure 3:
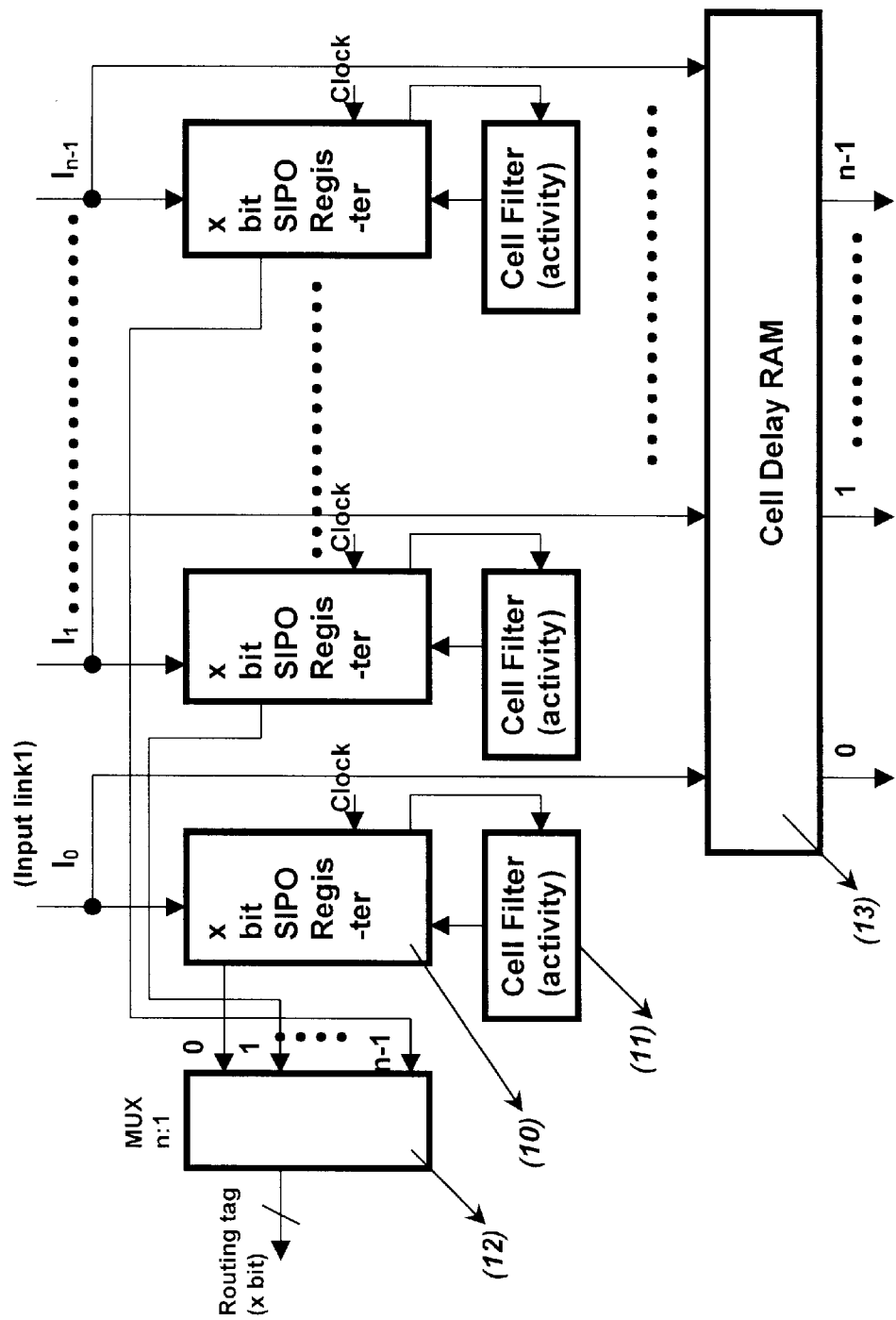
FIG. 3 shows the routing tag detachment module.
Figure 4:
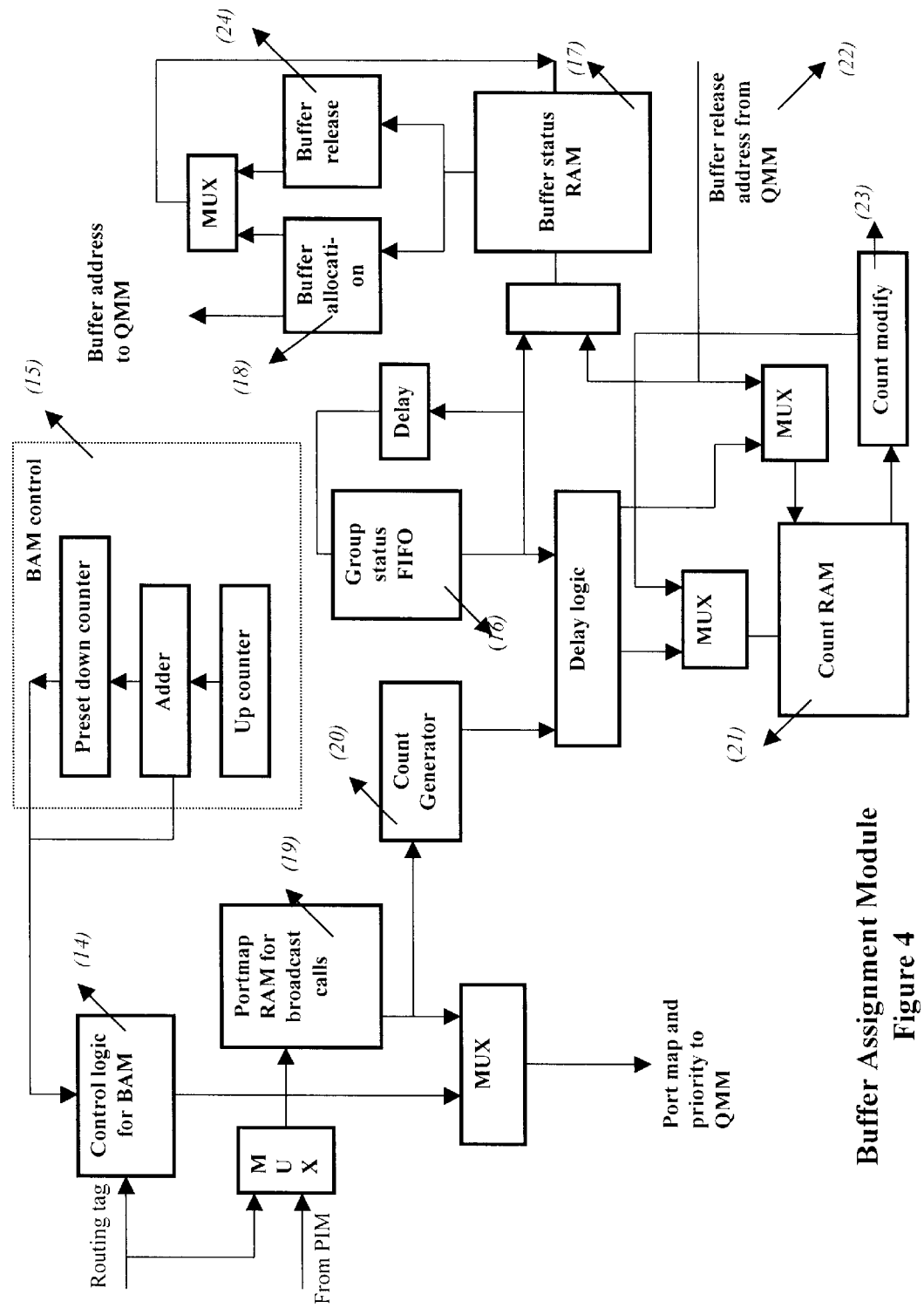
FIG. 4 shows the buffer assignment module.

The routing tag detachment module (RTD) (1), as shown in FIG. 3, forms the interface block for the input side which receives the input links, the reference clock and the start of cell signal. It performs the cell filtering function to filter out inactive cells and the extraction of routing tag from the incoming cell. It also provides the necessary delay for the incoming cells before they are given to ICS (3). The ICS (3) switches the cells in the L input links to the corresponding buffers allocated to the cells. The shared cell buffer pool SBP (4) provides the storage for the incoming cells in the shared memory architecture. The incoming cells from the ICS (3) are written into the corresponding buffers in the shared buffer pool (4). They are read out of the buffers based on the sequence of arrival and priority. The queue management module (5) provides the addresses of the cell buffers to be read out during the next cell time. This information is used to read out M buffers during a cell time. The OCS (6) switches the 560 buffer output ports to the M output ports of the switch. The BAM allocates a buffer for each incoming cell and frees them after the cell has been read out onto all destination ports. For broadcast cells, the module also translates the broadcast channel number into the destination port map. The QMM (5) maintains buffer address queues for each port. During each cell time, it determines the cell to be read out into each of the ports based on the priority of the cells. These addresses are passed to the OCS (6) which in turn read the corresponding cells out to the ports. The PIM (7) forms the interface between the switch fabric and the control processor in the system. The interface allows for the initialization and control of switch fabric. The external processor accesses and controls the events in the switch through control and status registers. This block provides an interface that enables these accesses. The PIM (7) is also responsible for collecting statistics that are needed to monitor and regulate the traffic through the switch. This provides the information to the external processor by the means of interrupt and status registers.

The RTD (1), as shown in FIG. 3, receives 'n' input links, the reference clock and the start of cell signal. RTD (1) performs the cell filtering (11) function and extraction of routing tag from the incoming cells. The necessary delay for the incoming cells before they are given to the ICS (3) is also provided by the RTD (1). While processing of the incoming signal the RTD (1) receives the 'n' input links where cells on all the 'n' links arrive synchronously. The input cell passes through an x bit SI/SO/PO register which, at the end of x bits from SOC, provides a x bit routing tag from each of the 'n' incoming cells. Here preferably x is 14.

The latched routing tag from all the 'n' links are passed to the BAM (2), one at a bit time, starting from the 1st link. The BAM (2) takes 114 bit times to allocate the buffers for the 'n' incoming cells and to set up the ICS (3). Till then the incoming cells are delayed by the cell delay RAM (13). The size of this RAM is 114×n which is serially written and read out as the cells come in. This is implemented with the help of separate counters for read and write, which provides the addresses for read & write. The read follows the write after 114 bits. The output from the RTD is RTDout which feeds the ICS (3).

Figure 6:
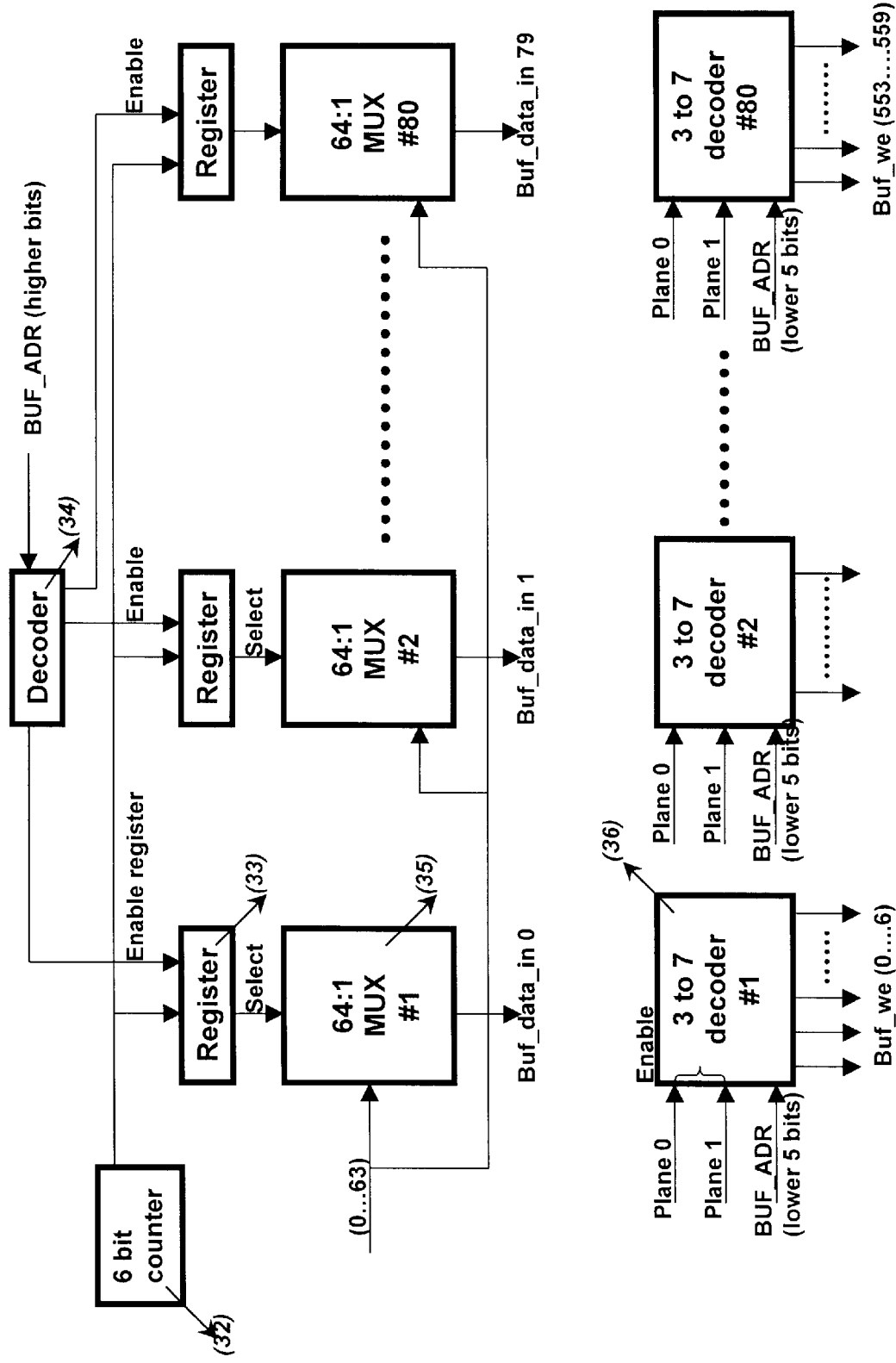
FIG. 6 shows input crossbar switch.
Figure 7:
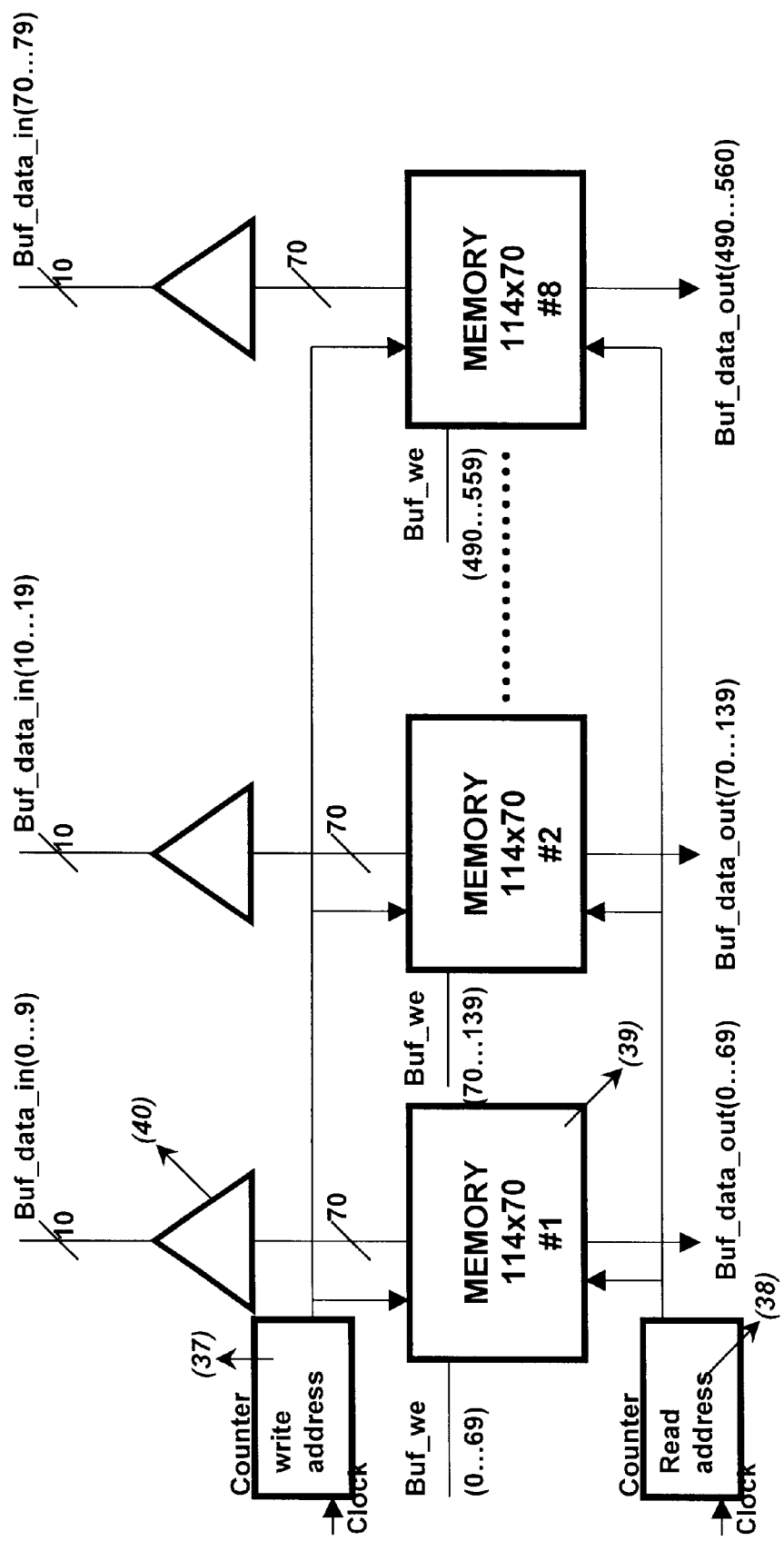
FIG. 7 shows shared buffer pool.

The ICS (3), as shown in FIG. 6, switches the cells in the 'n' input links to the corresponding buffers allocated to the cells. The ICS (3) routes the incoming cells to the buffers allocated to them. The switch is a n ×80 crossbar which switches the 'n' inputs to 'n' buffer groups out of 80 groups, depending on the inputs from the BAM (2). The crossbar is implemented as 80 planes of n: 1 muxes. Each plane has a 6 bit register (33) associated with it, which selects one of the 'n' inputs to be sent as the output.

For setting the crossbar, the buffer allocation mechanism does the allocation of buffers serially, taking one link after the other. Each bit time, a buffer is allocated to a link. A 6-bit counter (32) in the crossbar starts counting after the delay of routing tag extraction and BAM pipelining, from SOC. This is synchronous with a similar counter in the BAM. Each bit time the BAM sends a 7 bit buffer group address to the ICS (BUFADR(11..5)). This forms the address to select one of 80 registers associated with the planes of muxes. The 6 bit value of the counter (showing the link number for which that 7 bit buffer address is allocated) forms the data to be written into the register. In 64 bits time, 64 of the 80 registers get written with the select control information for the corresponding mux plane. After 64 bits time, all the 80 registers are enabled simultaneously so that the 80 planes of muxes of the crossbar is setup in 1 bit time. After this 1 bit delay, the input cells arrive at the n inputs of the ICS and get routed to the corresponding buffer groups.

The same time as the 7 bit group addresses are sent to the ICS, a 3 bit buffer identifier is also sent to the ICS to set up a set of eighty 3-to-7 decoders (36). This set of decoders generates the write enables/chip selects for the cell buffers. Depending on the BUFADR(11..5) value one of the 80 decoders is selected on each bit time. A signal named M_ACT is generated in the ICS that shows whether the decoder is to be enabled or not This signal M_ACT is asserted if the buffer allocated for the particular link is residing in the same plane ($PL_1PL_0$). For the groups which does not have any allocation for the current cell time and for groups with allocation in a different plane of buffers (different ACE chip) the signal M_ACT remains negated. The 3 bit buffer identifier forms the select signal for the decoders which are enabled thus generating one of the 7 WE/W_CS signals of that group.

Pursuant to such routing, the incoming cells are stored in the shared memory in the shared cell buffer pool (SBP) (4). The incoming cells from the ICS (3) is written into the corresponding buffers in the shared buffer pool (4). They are read out of the buffers based on the sequence of arrival and priority.

The shared cell buffer pool consists of 560 buffers which are grouped as block of 560 buffers in 80 groups with each group having 7 buffers. This cell buffer is of size 114 bits, i.e., the size of the sliced payload.

During a bit time, one write into the buffer and one read from the buffer is required to be done. So a 114×1 dualport RAM is required for the cell storage. This requires the use of a total of 560 such RAMs. For ease of VLSI implementation, the number of RAMs has to be reduced. So the 7 buffers in each group and 10 such groups are combined together to form a single RAM (39), thus forming a total of 8 RAMs of size 114×70. The RAMs used allow bit wise write enables so that this combining of RAMs is possible.

The address to all the cell buffer groups are common, since the write/read accesses to the cell buffers is synchronous where read immediately follows write. Two address counters (37 & 38), one for read (38) and one for write (37) are used to generate address to the RAMs. The ICS (3) gives out only one data line for each buffer group in the SBP (4). Since the organization in the SBP (4) has one separate data line for each of the 7 buffers in the buffer group, each dataline from the ICS (3) is spread out (40) to connect 7 lines in the SBP. The write is controlled by the WE signals from the ICS (3).

The read queue provides the addresses of the cell buffers to be read out during the next cell time. This information is used to read out (a maximum of) M buffers during a cell time. The OCS (6) switches the 560 buffer outputs to the M output ports of the switch.

Figure 8:
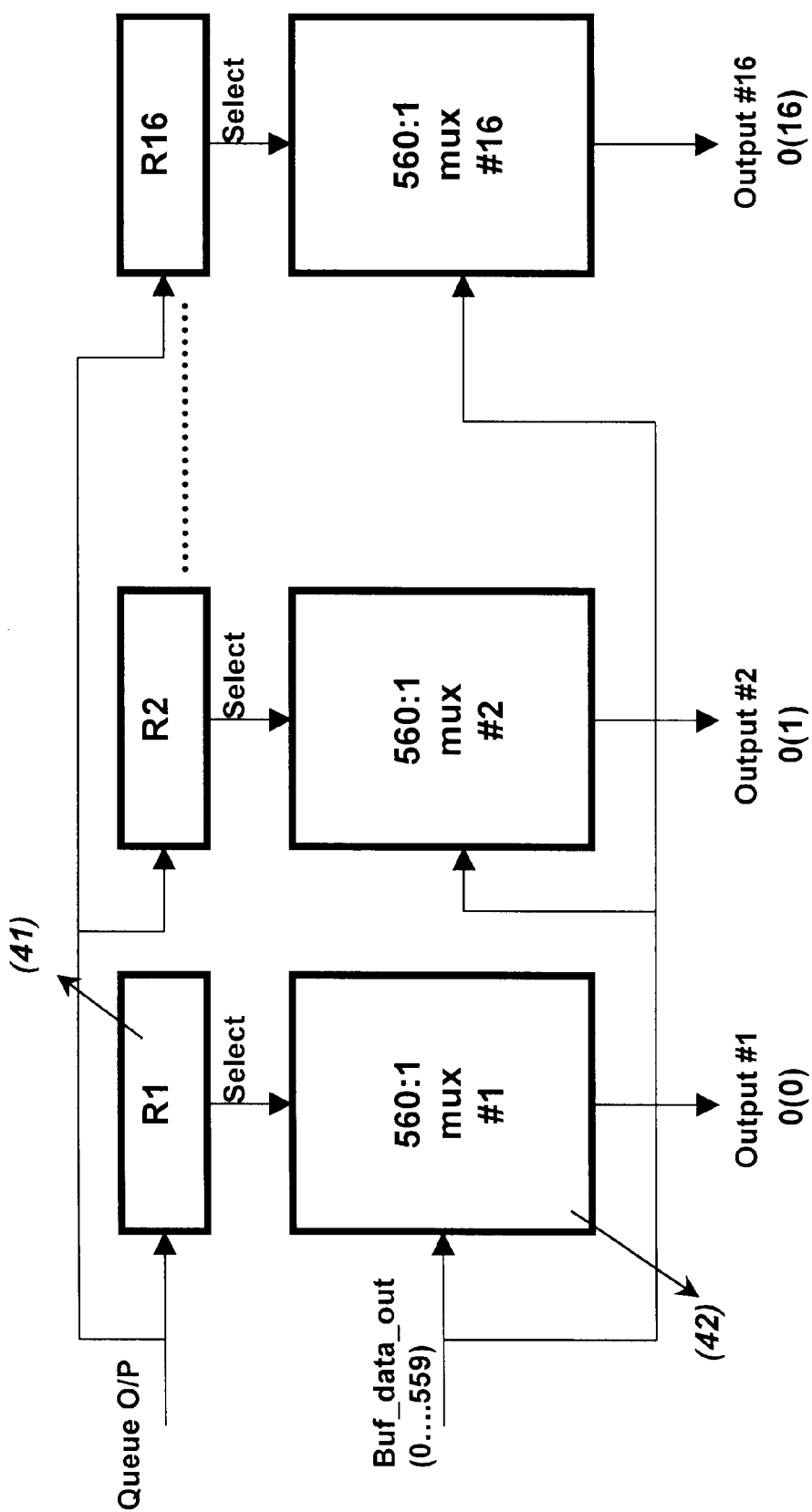
FIG. 8 shows output crossbar switch.

The OCS (6), as shown in FIG. 8, is a crossbar of size 560×M. It is organized as M planes of 560:1 muxes (42). Each plane is controlled by a register followed by a latch (41).

Figure 5:
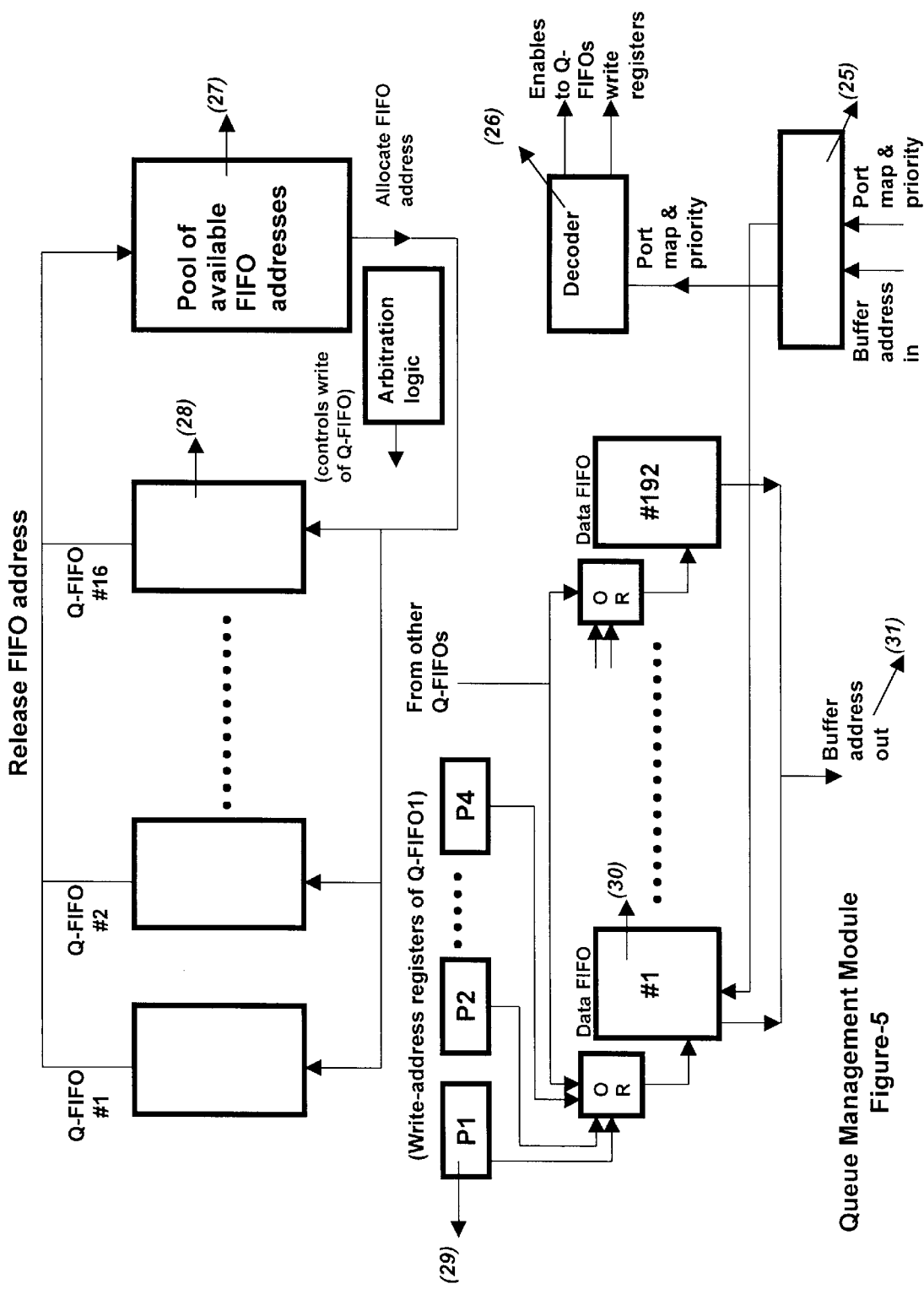
FIG. 5 shows the queue management module.

The QMM (5), as shown in FIG. 5, provides the M readout buffer addresses one after the other, after buffer allocation. A four bit counter is started in the OCS once the read out from the queue management starts. On each count, the buffer address to be read out for that particular port is sent to the OCS (6). The corresponding bits in the 13 bit buffer address is compared with $PL_1PL_0$ signals to find out whether the cell buffer is in the same plane or not. If the activity bit is valid and if the comparison failed then the cell is driven by some other plane. Then the outputs are placed in high impedance. If the read queue for the particular port is empty then the activity bit is invalid so that no cell buffer is read out for that port for the next cell time. Here too the outputs are placed in high impedance. When the SOC for the next cell arrives, the latch is enabled and the value in the register is loaded into the latch (41).

The routing tag from the L input links, extracted by the RTD (1) forms the input to the BAM (2). If the tag indicates that the link is active, it allocates a buffer for the cell, i.e., a buffer address is generated. If the incoming cell corresponds to a broadcast call, then using the BCN number in the tag, BCN translation table is accessed to get the output port bit map. In the case of a unlist cell, the output port map is generated by decoding the destination address field in the routing tag.

The allocated buffer address, output port bit map and priority are passed to the QMM (5). The BAM also passes the allocated buffer address, to ICS (3) for setting up the input to buffer crossbar.

The BAM block consists two RAMs and a FIFO for storing the buffer pool status. Buffer status RAM (BSR) (17) is a 80×28 dual port RAM used to store the availability information of buffers in each group. This RAM is updated each time a buffer is allocated or released. Count RAM (21) is a 2560×4 single port RAM used to store the count fields of the buffers. The count field indicates the number of times the corresponding buffer has to be read. This counter is updated each time the buffer is read. The FIFO (16) is of size 80×7 which stores the group numbers which have buffers available in them. The BAM (2) also houses the BCN RAM (19) that stores the translation from the Broadcast Channel Number to the destination port map. This is organized as a 1024×M single port RAM.

Upon reset, the FIFO (16) is initialized to contain consecutive group numbers from 0 through 79. BSR (17) is initialized to indicate the buffers available for allocation. Equipage ports are used to initialize the BSR. If the equipage value reads '0' it means that only one plane of switch is in use and only 7 buffers per group are available for allocation. Similarly an equipage of '1' indicates that 14 buffers per group are available. The BCN RAM (19) is expected to be initialized by the external processor and hence is not initialized. Count RAM (21) need not be initialized as it is always written into before being read from.

The routing tag starts arriving at the BAM (2) after the serial to parallel conversion in the RTD (1). During each bit time, it receives one routing tag. Upon receiving a routing tag, the BAM examines the activity bit. If a valid cell is present, then a group number is read out from the FIFO.

This group number forms the address to BSR (17), from which the group bit map is readout. Each bit represents the status of the buffers of this group. This bit map is scanned for the first available buffer. This buffer is marked for allocation (18) and the buffer address is generated. The group number is returned to the bottom of the FIFO if after the allocation, there are buffers still available in the group. If there are no free buffers in the pool then the group number is not written back.

Simultaneously, the nature of the cell (single destination/multi destination) is determined. In case the cell is destined to multiple ports, the BCN in the routing tag is used to address the BCN RAM. This RAM gives the destination port map for that BCN. In case the cell is for a single port, the destination port map is decoded from the address in the routing tag. The number of destinations in the port map is counted in order to be recorded in Count RAM (21).

The allotted group number and the buffer number are passed to ICS. The group number, buffer number, the destination port map and priority are passed to the QMM. The QMM adds the new buffer address into the corresponding queues and sends an acknowledge signal back to the BAM (2). In case any of the relevant queues are full, this acknowledge is held back by the QMM (5).

The changed values of the buffer status and the count value are written back into BSR (17) and Count RAM (21) only if the acknowledge signal is received from the QMM (5). The acknowledge signal being held back is equivalent to having dropped the cell as one or more of the destination queues were full.

During each cell time, the QMM (5) passes the addresses of the buffers that are being read out through read out buffer address bus (22). This process follows the buffer allocation after the queues have been written into. Using these addresses, the buffer status bit map and count values are readout from BSR (17) and Count RAM (21) respectively. The count value is decremented by one & written back into Count RAM (21). If the count becomes zero, then the status bit map is updated to indicate that the buffer is free to be used by another cell. If it is found during release, that the group number of the buffer that has just been released, earlier had all its buffers occupied, the group number is added to the FIFO.

The ICS (3) is a crossbar switch that is constructed on the assumption that only one buffer per group will be used in a cell time. In order that the group number returned to the FIFO is not used again in the same cell period, a pair of counters (one up count and one down count) are used (15).

The down counter is loaded with the total number of available groups at reset. The up counter is cleared. It is decremented whenever a group number is taken out from the FIFO. If this counter reaches zero, the FIFO is considered empty and all further cells in the same cell period are dropped due to non availability of buffer groups.

When a group number is returned back to FIFO (after allocation or after release), an up-counter is incremented. At the end of the buffer allocation & release process, the contents of the two counters are added and loaded into the down counter and the up counter is cleared. Thus at the beginning of each cell time, the down counter shows the total number of buffer groups available for that cell time.

The queue management module (5) maintains buffer address queues for each port. During each cell time, it determines the cell to be read out into each of the ports based on the priority of the cells. These addresses are passed to the OCS (6) and the SBP (4) which in turn read the corresponding cells out to the ports.

A total of N queues are maintained in the QMM (one for each port for each priority.) Each queue has the capacity to store upto 1024 entries. This makes the QMM a memory intensive module. Hence the resources required for this module are shared across all the ports. Also, in order to reduce the memory requirements in each switch, these queues are physically distributed across multiple slices, preferably, four slices.

The queues are implemented in a two level structure. The width of the buffer addresses that are to be stored is 12 bits. These addresses are stored in Data FIFOs (30). In order to achieve a sharing among the ports, these FIFOs are not dedicated to each queue. The FIFOs are split into smaller units of depth 32 each. A central pool of 192 such data FIFOs are provided in the switch.

Each queue requests for a data FIFO from the central pool (27) and is allocated a 32×12 FIFO by the arbitration mechanism. Each queue maintains the address of these data FIFOs in a second level of FIFOs called the Queue FIFOs (28). These are 8 bit wide (to be able to store the address of 192 Data FIFOs.) Each of the N queues are provided with a 32 word Queue FIFO. Thus the capacity of each queue is 32 (Data FIFOs per queue)×32 (capacity of each data FIFO)= 1024.

As the length of each queue increases beyond 32, another Data FIFO (30) is asked for and the central pool allocates one more from the pool. As and when the Data FIFOs become empty, they are returned back to the central pool (except in the case of the last FIFO which is retained.)

During buffer allocation, the buffer addresses arrive at the QMM at the rate of one per bit time. It is possible that a data FIFO (30) gets exhausted in the middle of such operations. In this case, there is not enough time to request for a new FIFO from the central pool. In order to take care of such situations, a reserve set of four data FIFOs are associated with each port referred to as the Advance Allocation Register (AAR) stack. As the data FIFOs get exhausted, a new one is taken from this stack and the stack requests the central pool for a new data FIFO.

The central pool of FIFOs (27) is initialized after reset to hold consecutive data FIFO addresses from 0 through 191. The 16 AAR stacks request for data FIFOs and these are serviced by the use of an arbiter. The servicing is in a round robin fashion, one port in each bit time. This guarantees that every request for a data FIFO is serviced within 16 bit times, provided that data FIFOs are available. Since the depth of the each data is 32, it is always ensured that there is enough time for the arbiter to service all ports in a round robin fashion.

The QMM (5) receives the allocated buffer address with the corresponding output port map and the cell priority from the BAM (2). On receiving the portmap & priority, the QMM (5) checks for availability of queue (whether the queue is full or not) and sends the information back to the BAM (2) for buffer allocation process to be completed. The QMM-WRITTEN signal is asserted if the queue is available for all the output ports requested by the portmap, otherwise it is kept negated. So the incoming cell is dropped even if any one of the requested queues is not available, for a broadcast call.

When a data FIFO becomes full, the queue FIFO takes the next data FIFO address from the AAR stack and the AAR raises a request to the FIFO pool. The address of the current date FIFO is also stored in a register for ready reference.

An up/down counter is provided per priority per output port, to keep track of the data FIFO status. The counter counts up once if a data is written into the data FIFO. When read out and write to is the same data FIFO then after each read out the counter counts down indicating that it has one content less. This up/down counter helps in requesting for a new data FIFO when one becomes full. For a broadcast call, the buffer address is written into all the queues of the output ports to which the cell has to go. In broadcast call, the cell is not copied into multiple copies, but the address of the buffer in which the cell is stored in all the queues it has to go. The buffer is released only after the last of the entries in the queue is read out.

After L bits of write into the QMM (5), the QMM is ready for setting up the OCS for the next cell period read out. The readout is based on the priority of the cells.

Due to gate count crunch the data FIFOs in the QMM (192 numbers) are split into N groups of 192/N FIFOs each and only one group is physically located in one slice. There is an external bus interconnecting these groups in the different slices. The slicing is done by a N-bit demultiplexer at the input port and a N-bit multiplexer at the output port. The incoming cell (43) is sliced by a N-bit demultiplexer (44), as shown in FIG. 9, in different slices (45). The N-slices when processed (46) are the recombined by a N-bit multiplexer (47) at the output port to give the output cell (48).

Though the data FIFOs are spread across all N slices, N preferably being 4, the queue FIFOs are replicated in all N slices. During readout, the queue FIFO gives out the address of the data FIFO to be read out. Based on the slice indication bits ($SL_1SL_0$) the switch determines if the data FIFO is located within or in the other slice. (Slice=0 implies that the valid data addresses are between 0 and 47 and so on). In case the data FIFO is located within the device, it is read out and this value is presented on the external bus for the use of other slices. The other slices use this data as though the data has been read from it's own data FIFO set.

The readout is done for each output one after the other, to set up the OCS. The read is from the top of the data FIFO whose address is the top of the queue FIFO.

Each read from the data FIFO is spread over 2 bits time, to reduce the frequency of operation of the external bus. The readout buffer address is passed to the BAM for buffer release and to the OCS for setting up the crossbar.

The ATM cell switch element of the instant invention supports input at a standard basic link speed, multiples of standard basic link speeds and/or any combination of these. Preferably the standard basic link speed is STM-1 while multiples of such basic link speed are STM-4 and STM-16 inputs or any combination of these. This is achieved by grouping the inputs and outputs in groups of four. Four such groups form a bigger block for STM-16 support. Any of these groups are configured as STM-1 or STM-4 by programming a control register. At the input of the switch the physical STM-4 STM-16 (49) link is demultiplexed into 4/16 STM-1 (51) links by a cell demultiplexer (50). If the output group is an STM-4 output; then the queue build up is in the first output port queue only. The other three output port queues are not used. When read out, four cells are read out from the same queue, for the group of STM-4 output. In case of STM-16 only the first queue is used per output STM-16 port block and the other 15 queues are unused. 16 cells are readout from the same port queue for the same cell period. Cells at the output of the ACE (52) are multiplexed again by a cell multiplexer (53) to get the STM-4/STM-16 link (54).

No change is done in the buffer allocation scheme in order to support links at STM-4/STM-16 speeds. In the QMM, only one queue is maintained for each STM-4 link although the input is from four input links. The destination address of the STM-4 outputs are ignored for the last two bits (d1d0) in the routing tag, so that the port map generated automatically points to the first, fifth, ninth or thirteenth queue.

The important task done by the ATM of the instant invention is to select the queues in sequence such that the correct queue is read the correct number of times. For example, if all the links are at STM-1 speed, i.e., maintaining 16 queues, the sequence of queue would be Q1, followed by Q2 and so on up to Q16. In case where all the links are at STM-4, i.e., maintaining 4 queues, the queue readout would be Q1, Q1, Q1, Q1, followed by Q4, Q4, Q4, Q4 and so on up to Q16 four times.

This specific queuing, is achieved by the use of ring counter (62) and a decoder (60) to select the appropriate queue. The first time a queue is read the data goes to the first read out register. The second time a queue is read, the enable would have advanced to the second register and hence, the data the data would be written into the second read out register.

The select generator is responsible for generating the sequence of queue numbers to be read out. The decoder (60) converts the queue number so generated into a select signal for the queue.

The input to the decoder is from a 4-bit counter (55). This counter is a standard "up counter" that produces the sequence "0000" followed by "0001" which is the binary equivalent of counting 0, 1, 2, 3 and so on. The output signals of this counter are designated bit wise C3, C2, C1, C0 respectively.

There are two stages of multiplexers (57 &59) each of which select the appropriate value as determined by the select signal. The first check made is if the switch is working in STM-16 mode, i.e., maintaining a single queue. In case the switch is working in the STM-16 speed, all the reads are to be done from Q1. Hence the output from this logic remains at "0000" at all times. This is achieved by the first multiplexer (57) which selects a fixed value of "0000" is the signal STM-16 is high. If this is low, it selects the other signal that comes from the other multiplexer.

At the second stage, the next multiplexer determines if the switch is working in the STM-4 speed, i.e., maintaining one queue for four ports. If so then 4 reads have to be from Q1 and 4 more from Q5. This means that the select signals have to be read "0000" and "0100". Here the last two bits always remain "0" and the left most bits alone changes after 4 values. In the normal counter sequence, this corresponds to the C3C2 bit.

If the switch is operating in STM-1, then the normal counter is allowed to pass through giving values from 0–15 in sequence (thus selecting Q1 to Q16 in sequence).

Thus with the help of a ring counter and two levels of multiplexers, the desired goal of sequencing as well as configurability is achieved.

The entire switch instead of dealing at one speed also functions as a combination of speeds. For further configurability, it is desirable that there be mix of speeds, for instance, three links at STM-4 and 4 links at STM-1. In order to be able to support this, the control signals for the multiplexers have to be dynamic. The value on these signals is made to depend upon the current value of the 4-bit counter.

Specifically, if the switch is designed to support 16 STM-1 links, one bit is required to state if the switch is operating at STM-16. If this is the case, no further information is required. This is because, the STM-16 speed can not be combined with any other speed as STM-16 itself accounts for the entire throughput.

Further, the ports could be in STM-4 mode in groups of 4, hence, 4 bits configure the speeds. There is no need for an STM-1 control register as whatever is not configured to be of the higher speeds is taken as STM-1 speed and individual queues are maintained for these.

Now the values in these bits are dynamically used. This is done by selecting the state of the control signal by using the state of four bit counter. The STM-16 signal is a single signal and is hence used directly in the final multiplexer stage. Similarly the first two bits of the counter (55) is used as the select signal for the STM-4 control register multiplexers. The outputs from these multiplexers form the control signals for the multiplexers. Thus the ATM cell switch element, ACE, of present invention achieves the configurability and sequencing in the desired order.

The processor interface module (7) forms the interface between the switch fabric and the control processor in the system. The interface allows for the initialization and control of the switch fabric. The external processor accesses and controls the events in the switch through the control and status registers. This block provides an interface that enables these accesses.

The processor interface is provided through a high bandwidth 16 Bit non-multiplexed bus. The PIM receives an address bus and control signals and also receives a bidirectional data bus. Upon completion of the access, it drives the termination signal to the external processor.

The assertion of the RESET signal brings the chip to the initial state where all internal state machines, registers and read queues are cleared. The bitmap RAM, the group number FIFO (in the BAM) and the pool of available RAMs (in the QMM) are initialized to contain the reset values, once the reset signal is negated An internal 'INIT' signal is generated and is used for initializing these memories.

All operations in the processor interface are asynchronous. The access to the switch starts with the assertion of address strobe signal. This signal implies that the address lines at the switch have a valid address. Read and write accesses are distinguished by the signal levels on the RIW~ lines. These signals are valid before the assertion of the address strobe. The size of the access (word/byte) is indicated through the data strobe lines. For write accesses, these signals also imply that the data signals at the switch are valid. For the read access, the data strobe signals imply that the processor is ready to receive the data from the service.

Upon completion of the access, the switch asserts an acknowledge signal. For write accesses, this signal implies that the data has been written into the switch and for read accesses, it implies that the data driven by the switch is valid. Access termination is by withdrawal of the address and data strobes.

The PIM collects statistics that are needed to monitor and regulate the traffic through the switch. This block provides the information to the external processor by the means of interrupts and status registers.

The statistics that are collected in the switch are

Total cell loss due to non availability of buffers (CLB)

Total cell loss due to output queue length overflow (CLQ)

Total cell loss in the switch (TCL)

Total cell buffer occupancy (TBO)

Individual output queue lengths for each port per priority (QL0. . . . QL63)

With this information, the external call processor determines the loading of the switch and adjust the acceptance criteria for new calls or control existing cells. CLB and CLQ help in grading the quality of service being provided by the switch in terms of cell loss. TBO gives the general load in the switch and QL is used to determine the port loading as well as to determine the average delay parameter for that port. The total cell buffer occupancy in the switch is counted with the help of counters provided in BAM (2). For measuring queue length in each of the queue maintained in by QMM (5), a set of counters are provided in the QMM (5). Similarly BAM (2) comprises counter for counting the number of cells that are dropped by the switch due to lack of availability of buffers. The number of cells dropped due to queue overflow is counted by counter provided in the QMM (5).

The above description describes an embodiment of the present invention and it would be appreciated by those skilled in the art that alternative arrangements within the spirit and scope of the present invention are possible. The above description does not in any manner restrict the broad scope of the instant invention.

We claim:

1. An ATM switch for switching cells from a plurality of input ports to a plurality of output ports supporting a plurality of priority levels, comprising a routing tag detachment module for filtering the input cells, extracting the routing tag from the said filtered input cells, delaying the said filtered cells till the routing tag is processed;

a buffer assignment module for decoding the said routing tag received from the said routing tag detachment module, generating a cell destination port map and priority levels, allocating an internal cell buffer for the incoming cells, deallocating the corresponding cell buffer for outgoing cell, one or more configuration ports provided in the said buffer assignment module for configuring the total number of buffers available;

an input cross bar switch for transmitting cells from the said routing tag detachment module to the said cell buffers allocated by the said buffer assignment module, generating the required control signals for writing the transmitted cell to the said allocated cell buffer, said cell buffer being housed in a shared cell buffer pool organized as a bank of a plurality of groups each containing a plurality of cell buffers;

a queue management module having shared queue memories for receiving the allocated buffer addresses, corresponding cell destination port maps and the priority level of the cells from the said buffer assignment module, sequencing the reading of said cell buffers from the said shared cell buffer pool based on the priority level of the cells; and an output cross bar switch for transmitting the cells read out from the said shared cell buffer pool to the said output ports of the said switch.

2. An ATM switch for switching cells from a plurality of inputs ports to a plurality of output ports as claimed in claim 1, further comprising one or more configuration ports provided in the said buffer assignment module for configuring the total number of buffers available, one or more configuration ports provided in the said input crossbar switch and output crossbar switch for determining the range of buffer addresses supported in the devices.

3. An ATM switch for switching cells from a plurality of input ports to a plurality of output ports as claimed in claim 1, further comprising a means for counting total buffer occupancy in the switch, wherein the said means is a counter provided in the buffer assignment module.

4. An ATM switch for switching cells from a plurality of input ports to a plurality of output ports as claimed in claim 1, further comprising a means for counting the total queue length in each of the queue maintained by queue management module wherein the said means is a set of counters provided in the queue management module.

5. An ATM switch for switching cells from a plurality of input ports to a plurality of output ports as claimed in claim 1 further comprising a means for counting the number of cells that are dropped by the switch due to lack of buffers availability wherein the said means is a counter provided in the said buffer assignment module.

6. An ATM switch for switching cells from a plurality of input ports to a plurality of output ports as claimed in claim 1, further comprising a means for counting the number of cells that are dropped by the switch due to queue overflow wherein the said means is a counter provided in the queue management module.

7. An ATM switch for switching cells from a plurality of input ports to a plurality of output ports as claimed in claim 1, further comprising a processor interface module for initializing and controlling the said switch through control registers situated in the processor interface module and monitoring the said switch through reading of the said counters.

8. An ATM switch for switching cells from a plurality of input ports to a plurality of output ports supporting a plurality of priority levels, comprising a N-bit demultiplexer at the input port for slicing the incoming cells into N bit slices thus reducing the speed of operation by a factor of N and reducing the depth of the shared buffer pool storing the cells by a factor of N, each bit slice being delivered to a routing tag detachment module of the said ATM switch for filtering the sliced input cells, extracting the routing tag from the said filtered input cells, delaying the said filtered cells till the routing tag is processed;

a configurable buffer assignment module for decoding the said routing tag received from the said routing tag detachment module generating a cell destination port map and priority levels, allocating an internal cell buffer for the incoming cells, deallocating the corresponding cell buffer for outgoing cell, one or more configuration ports provided in the said buffer assignment module for configuring the total number of buffers available;

an input cross bar switch for transmitting cells from the said routing tag detachment module to the said cell buffers allocated by the said buffer assignment module, generating the required control signals for writing the transmitted cell to the said allocated cell buffer, said cell buffer being housed in a shared cell buffer pool organized as a bank of plurality of groups each containing a plurality of cell buffers, one or more configuration ports provided in the said input crossbar switch for determining the specific range of cell buffer addresses supported by the said shared cell buffer pool;

a queue management module having shared queue memories placed across all the 'N' slices thus reducing the queue memories in each slice by a factor of N thereby reducing the area of queue management module, for receiving the allocated buffer addresses, corresponding cell destination port maps and the priority level of the cells from the said buffer assignment module, sequencing the reading of said cell buffers from the said shared cell buffer pool based on the priority level of the cells, one or more configuration ports provided in the said queue management module for configuring the said bit slice numbers, determining the specific range of queue memory addresses supported by each of the said queue management modules;

an output cross bar switch comprising one or more configuration ports determining the specific range of cell buffer addresses supported by the said shared cell buffer pool, for transmitting the cells read out from the said shared cell buffer pool to an N-bit multiplexer for recombining the N-bit sliced outputs from the N-output crossbar switches at the output port of the said switch.

9. An ATM switch for switching cells from a plurality of input ports to a plurality of output ports supporting a plurality of priority levels, accepting inputs at a standard basic link speed, multiples of the standard basic link speed and combinations thereof while maintaining a constant throughput by the use of a cell demultiplexer at the input port for inputs operating at speeds higher than the standard basic link speed, comprising a N- bit demultiplexer at the input port for slicing the incoming cells into N bit slices thus reducing the speed of operation by a factor of N and reducing the depth of the shared buffer pool storing the cells by a factor of N, each bit slice being delivered to a routing tag detachment module of the said ATM switch for filtering the input cells, extracting the routing tag from the said filtered input cells, delaying the said filtered cells till the routing tag is processed;

a configurable buffer assignment module for decoding the said routing tag received from the said routing tag detachment module generating a cell destination port map and priority levels, allocating an internal cell buffer for the incoming cells, deallocating the corresponding cell buffer for outgoing cell, one or more configuration ports provided in the said buffer assignment module for configuring the total number of buffers available;

an input cross bar switch for transmitting cells from the said routing tag detachment module to the said cell buffers allocated by the said buffer assignment module, generating the required control signals for writing the transmitted cell to the said allocated cell buffer, said cell buffer being housed in a shared cell buffer pool organized as a bank of plurality of groups each containing a plurality of cell buffers, one or more configuration ports provided in the said input crossbar switch for determining the specific range of cell buffer addresses supported by the said shared cell buffer pool;

a queue management module having shared queue memories placed across all the 'N' slices thus reducing the queue memories in each slice by a factor of N thereby reducing the area of queue management module, for receiving the allocated buffer addresses, corresponding cell destination port maps and the priority level of the cells from the said buffer assignment module, sequencing the reading of said cell buffers from the said shared cell buffer pool based on the priority level of the cells, one or more configuration ports provided in the said queue management module for configuring the said bit slice numbers, determining the specific range of queue memory addresses supported by each of the said queue management modules, maintaining a single queue across multiple output ports for links operating at speeds higher than the standard basic link speed to ensure the order of delivery of cell in conformity with the order of the cell arrival at the input for all cells within each ATM connection;

an output cross bar switch comprising one or more configuration ports determining the specific range of cell buffer addresses supported by the said shared cell buffer pool, for transmitting the cells read out from the said shared cell buffer pool to an N-bit multiplexer for recombining the N-bit sliced outputs from the N-output crossbar switches; and a cell multiplexer receiving the said recombined cells at output ports operating at speeds higher than the standard basic link speed to obtain the cells at the desired operating speeds.

* * * * *